(12) United States Patent
Tsai et al.

(10) Patent No.: US 11,660,706 B2
(45) Date of Patent: May 30, 2023

(54) WELDING QUALITY DETECTION SYSTEM AND WELDING QUALITY DETECTION METHOD

(71) Applicant: INDUSTRIAL TECHNOLOGY RESEARCH INSTITUTE, Hsinchu (TW)

(72) Inventors: Tsung-Ying Tsai, Hsinchu (TW); Kun-Tso Chen, Hsinchu (TW); Chih-Wei Chien, Hsinchu (TW); Chung-Hsin Hsiao, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 489 days.

(21) Appl. No.: 16/724,551

(22) Filed: Dec. 23, 2019

(65) Prior Publication Data
US 2021/0146483 A1 May 20, 2021

(30) Foreign Application Priority Data
Nov. 18, 2019 (TW) .................................. 108141851

(51) Int. Cl.
*B23K 31/12* (2006.01)

(52) U.S. Cl.
CPC .................................. *B23K 31/125* (2013.01)

(58) Field of Classification Search
CPC .... B23K 31/125; B23K 11/36; B23K 11/253; G01N 35/1011; G01B 5/20; G01B 5/28; G05B 2219/37217; G05B 1/06
See application file for complete search history.

(56) References Cited

U.S. PATENT DOCUMENTS

| 6,357,286 B1 * | 3/2002 | Kanematsu .............. G01B 5/28 |
| | | 73/105 |
| 6,937,329 B2 | 8/2005 | Esmiller |

(Continued)

FOREIGN PATENT DOCUMENTS

| CN | 101201339 | 6/2008 |
| CN | 101303221 | 11/2008 |

(Continued)

OTHER PUBLICATIONS

Taiwanese Office Action for Taiwanese Patent Application No. 108141851 dated May 28, 2020.

(Continued)

*Primary Examiner* — Justin C Dodson
*Assistant Examiner* — Dilnessa B Belay
(74) *Attorney, Agent, or Firm* — Amin, Turocy & Watson, LLP

(57) ABSTRACT

A welding quality detection system and a welding quality detection method are provided. A detection device applies a force to at least one weld point of a first welded object or a second welded object that are welded together. A displacement detector detects a displacement signal that varies with the force or time between the first welded object and the second welded object based on the force. A detection module receives or records the displacement signal and determines whether a gap exists between the first welded object and the second welded object based on a slope of the displacement signal, so as to detect the welding quality of the weld point quickly and precisely.

8 Claims, 8 Drawing Sheets

(56) References Cited

U.S. PATENT DOCUMENTS

| | | |
|---|---|---|
| 8,153,921 B2 | 4/2012 | Pieterman |
| 8,269,979 B2 | 9/2012 | Klein et al. |
| 8,541,746 B2 | 9/2013 | Andres et al. |
| 2009/0021747 A1* | 1/2009 | Kawasaki .............. G01Q 60/32 356/501 |
| 2009/0300930 A1* | 12/2009 | Ishikawa .................. G01B 5/20 73/105 |
| 2010/0288033 A1* | 11/2010 | Mizutani .............. G01B 5/0016 700/28 |
| 2015/0082646 A1 | 3/2015 | Palynchuk et al. |
| 2020/0376605 A1* | 12/2020 | Seo ........................ B23K 11/36 |

FOREIGN PATENT DOCUMENTS

| | | |
|---|---|---|
| CN | 203751516 | 8/2014 |
| CN | 104111196 | 10/2014 |
| CN | 204902804 | 12/2015 |
| CN | 205900713 | 1/2017 |
| CN | 107316298 | 11/2017 |
| CN | 107783056 | 3/2018 |
| CN | 109001224 | 12/2018 |
| CN | 109202237 | 1/2019 |
| CN | 109676281 | 4/2019 |
| CN | 109877489 | 6/2019 |
| JP | 2001-038467 | 2/2001 |
| TW | M472833 | 2/2014 |

OTHER PUBLICATIONS

Bebiano, et al. "A Weld Defects Detection System Based on a Spectrometer", Sensors—Open Access Journal; Apr. 2009; 133-145.

Rodil, et al. "Laser welding defects detection in automotive industry based on radiation and spectroscopical measurements", The International Journal of Advanced Manufacturing Technology; Jul. 2010; vol. 49, Issue 1-4, pp. 133-145.

Oliver "An improved technique for determining hardness and elastic modulus using load and displacement sensing indentation experiments", Metals and Ceramics Division, Oak Ridge National Laboratory, Oak; Journal of Material Research; Jun. 1992; 1564-1583.

\* cited by examiner

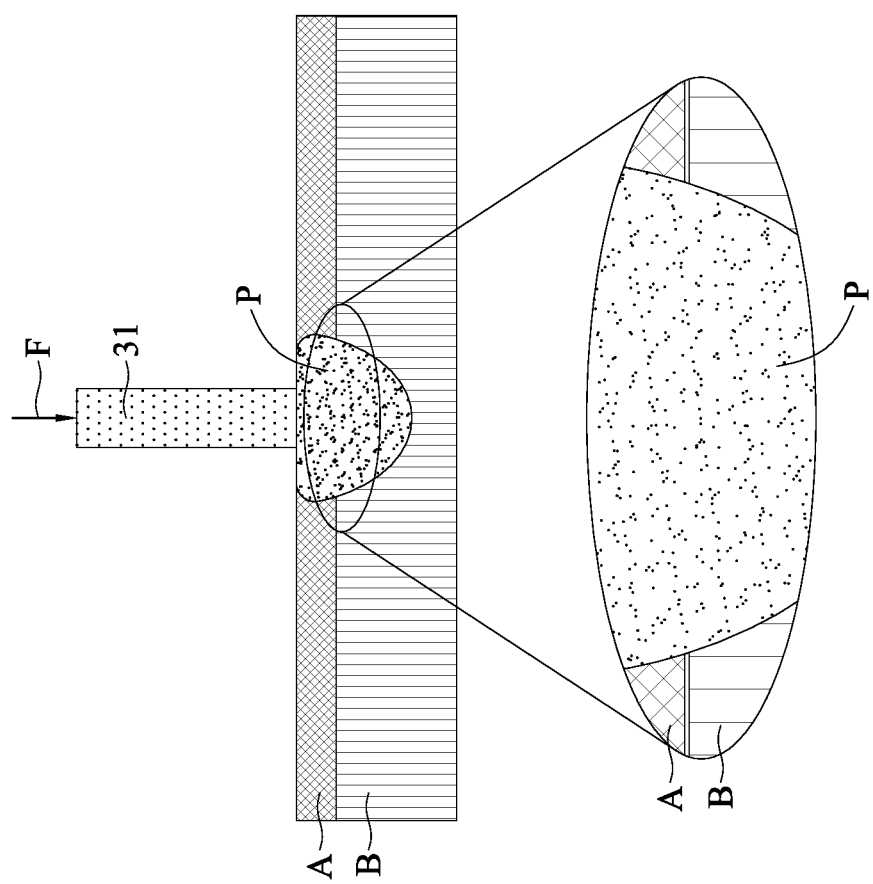

WELDING QUALITY DETECTION SYSTEM AND WELDING QUALITY DETECTION METHOD

CROSS-REFERENCE TO RELATED APPLICATIONS

This application claims priority to Taiwan Application Serial No. 108141851, filed on Nov. 18, 2019. The entirety of the above-mentioned patent application is hereby incorporated by reference herein and made a part of this specification.

BACKGROUND

1. Technical Field

The present disclosure relates to welding quality detection techniques, and, more particularly, to a welding quality detection system and a welding quality detection method.

2. Description of Related Art

A modern 3C product usually needs two to six batteries to operate. With the vigorous development of electric vehicles, the number of batteries required for each electric bus is as high as 7,000 batteries. When batteries are modularized, it is common to bond two welded objects (electrodes) of these battery modules or bus-bars by means of overlapped welding. However, it is difficult to detect the welding quality of a weld point of the two welded objects. In addition, as the number of weld points increases, it takes much time to detect the welding quality of all of the weld points, thereby affecting the productivity.

Currently, the welding quality of weld points is detected manually. For example, a detector checks a weld point manually to determine if the weld point is solid. However, manual detection is time and labor consuming and is not accurate, especially for the weld point in the center of the module. Geometric detection, resistance detection and temperature detection were brought to the market to detect the welding quality of weld points. However, these prior art detection mechanisms are not stable and are limited to be used in certain environments.

Therefore, how to provide a novel and inventive welding quality detection system and a welding quality detection method is becoming an urgent issue in the art.

SUMMARY

The present disclosure provides a welding quality detection system and a welding quality detection method, which detect the welding quality of a weld point of a first welded object and a second welded object that are welded together based on a slope of a displacement signal.

According to an embodiment, a welding quality detection system of the present disclosure comprises: a detection device configured for applying a force to at least one weld point of one of a first welded object and a second welded object that are welded together; a displacement detector configured for detecting a displacement signal that varies with the force or time between the first welded object and the second welded object based on the force applied to the weld point by the detection device; and a detection module configured for receiving or recording the displacement signal and determining whether a gap exists between the first welded object and the second welded object based on a slope of the displacement signal.

According to another embodiment, a welding quality detection method of the present disclosure comprises: applying, by a detection device, a force to at least one weld point of one of a first welded object and a second welded object that are welded together; detecting, by a displacement detector, a displacement signal that varies with the force or time between the first welded object and the second welded object based on the force applied to the weld point by the detection device; and receiving or recording, by a detection module, the displacement signal and determining whether a gap exists between the first welded object and the second welded object based on a slope of the displacement signal.

BRIEF DESCRIPTION OF DRAWINGS

FIG. 4A schematically illustrates a detection device of FIG. 1 applying a force to a weld point of a first welded object of an embodiment, wherein no gap exists between the weld point of the first welded object and a second welded object;

DETAILED DESCRIPTION

Figure 1:
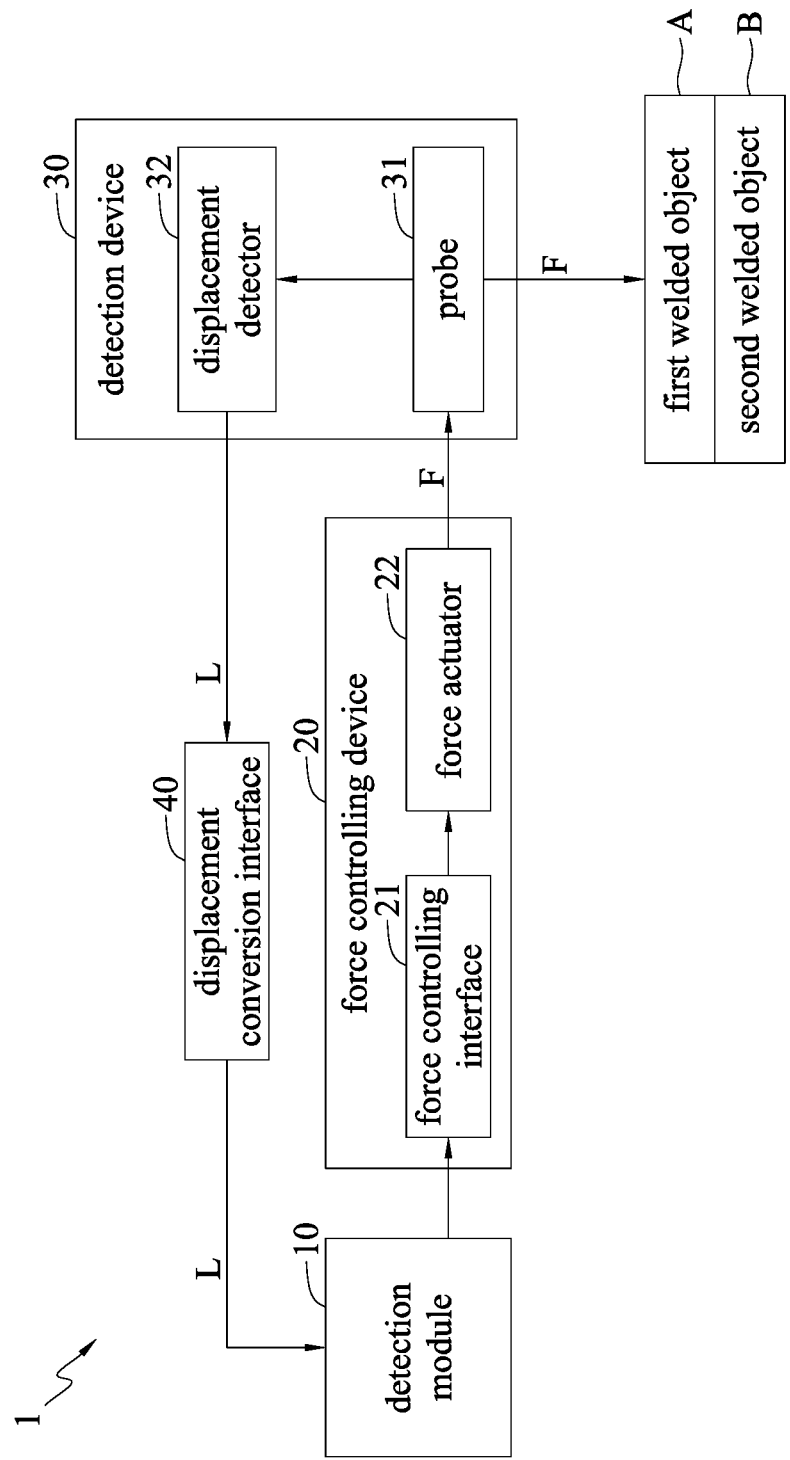
FIG. 1 is a block diagram of a welding quality detection system according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a block diagram of a welding quality detection system 1 according to the present disclosure. The welding quality detection system 1 comprises a detection device 30, a displacement detector 32 and a detection module 10. In an embodiment, the welding quality detection system 1 further comprises a force controlling device 20 having a force controlling interface 21 and a force actuator 22, and a displacement conversion interface 40.

In an embodiment, the detection device 30 is a hardware detection instrument. In another embodiment, the displacement detector 32 is a hardware displacement signal detector. In yet another embodiment, the detection module 10 is a hardware detection chip, detection circuit, data processor, analyzing device, electronic device (e.g., a computer or a server) having detecting functions (data processing or analyzing), software detection program, data processing program and analyzing program, or a combination thereof. In an embodiment, the force controlling device 20 is a pressure controlling device, or a pressing force controlling device. In an embodiment, the force controlling interface 21 is a hardware force controller or a force controller having a force controlling program. In an embodiment, the force actuator 22 is a hardware force actuating chip or a force actuating circuit. In an embodiment, the displacement conversion interface 40 is a hardware displacement converter or a displacement converter having a displacement converting program. In an embodiment, the following first welded object A and second welded object B are metal boards (e.g., thin metal boards less than or equal to 1 mm in thickness), metal sheets, or electrodes (e.g., electrodes of batteries). In an embodiment, the first welded object A and the second welded object B are two metal boards or two electrodes that are welded together (e.g., overlapped and welded) by a welding tool (e.g., laser or welding torch).

The detection device 30 applies a force F (e.g., a pressure or a pressing force) to at least one (or a plurality of) weld point P of one of the first welded object A and the second welded object B that are welded together (see FIG. 2A, FIG. 3A, FIG. 4A or FIG. 5A), and the force F applied by the detection device 30 to the weld point P is constant or increases as time elapses. The displacement detector 32 detects a displacement signal L (e.g., a displacement varying signal) that varies with the force F or time between the first welded object A and the second welded object B based on the force F applied by the detection device 30 to the weld point P. The displacement signal L can be a displacement signal L1 shown in FIG. 4B or a displacement signal L2 shown in FIG. 5B.

Figure 2B:
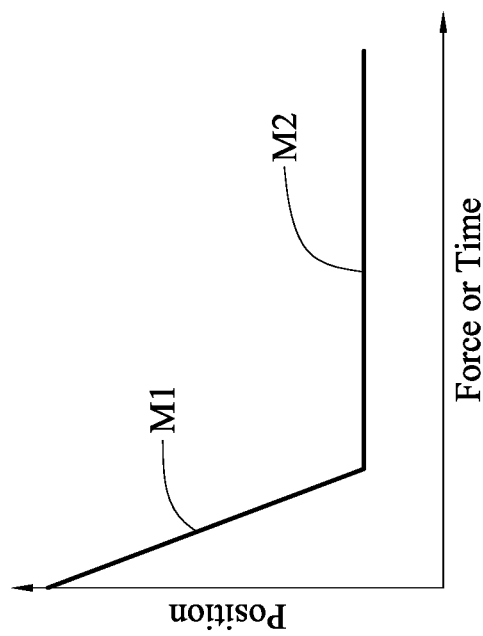
FIG. 2B is a curve showing a slope of a displacement signal that varies with a force or time detected by the detection module of FIG. 1 based on the operation of the detection of FIG. 2A.
Figure 3B:
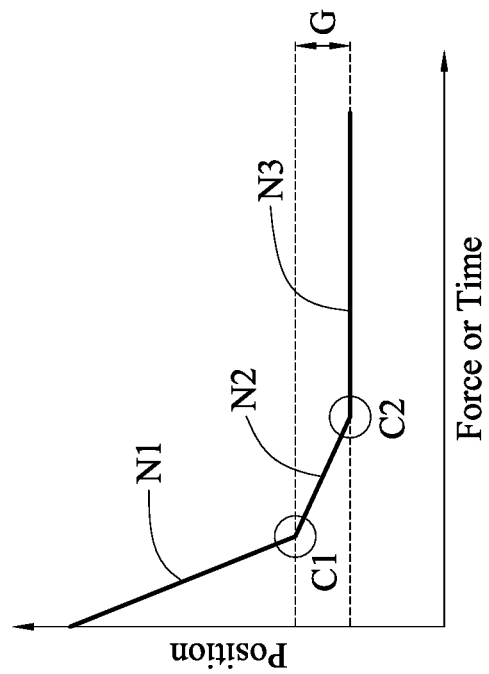
FIG. 3B is a curve showing a slope of a displacement signal that varies with a force or time detected by the detection module of FIG. 1 based on the operation of the detection of FIG. 3A.
Figure 4B:
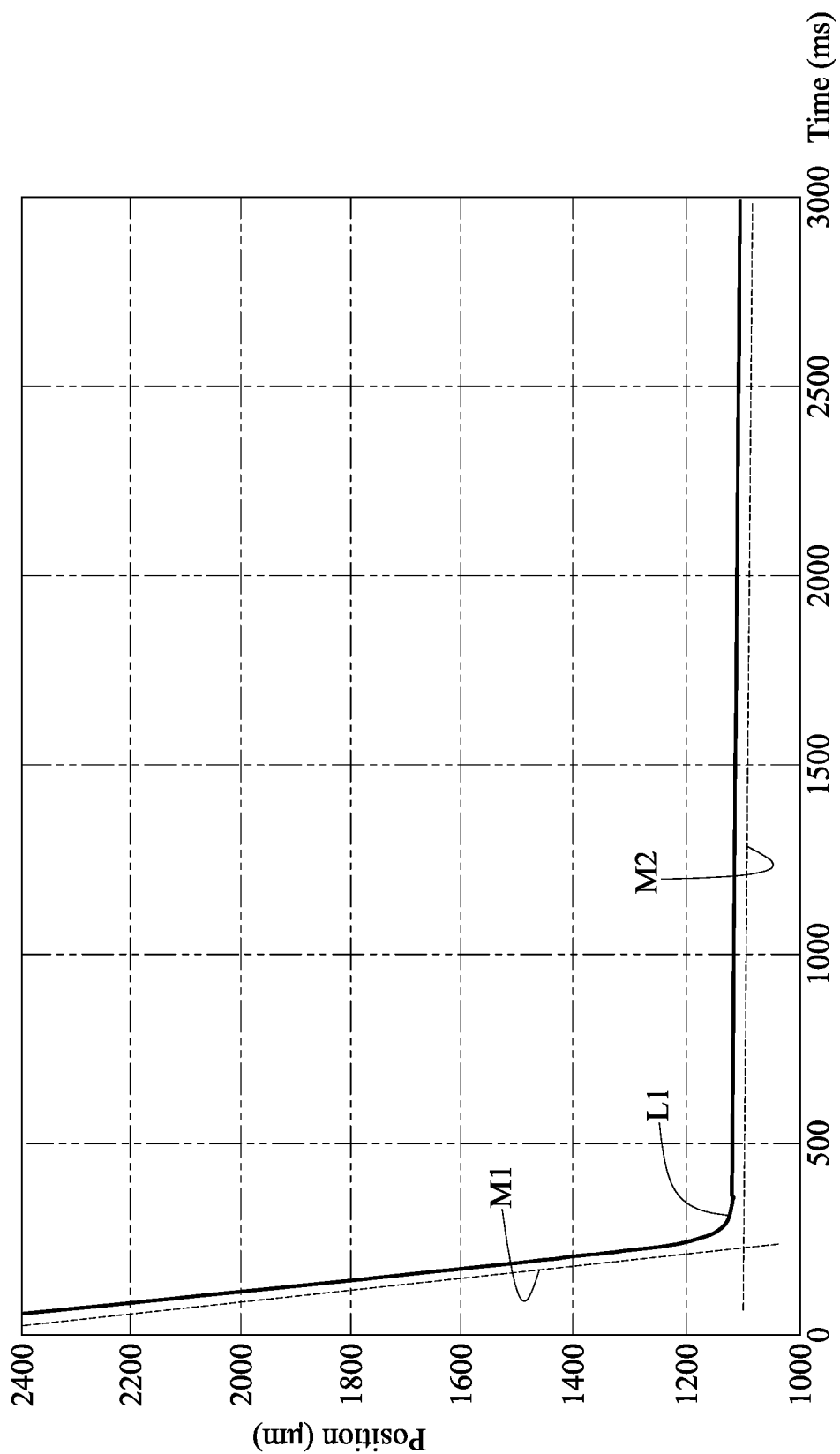
FIG. 4B is a curve showing a slope of a displacement signal that varies with a force or time detected by the detection module of FIG. 1 based on the operation of the detection of FIG. 4A.

The detection module 10 receives or records the displacement signal L, and determines whether a gap G exists between the first welded object A and the second welded object B based on a slope of the displacement signal L, to detect the welding quality of the weld point P. In an embodiment, the displacement signal L has one slope (e.g., a second slope M2), as shown in FIG. 2B or FIG. 4B, two slopes (e.g., a first slope M1 and a second slope M2), or three slopes (e.g., a first slope N1, a second slope N2 and a third slope N3), as shown in FIG. 3B or FIG. 5B.

When the displacement signal L has a constant position value (i.e., where the probe 31 is placed), or the position value is stable (e.g., varying within 1%, 3% or 5% during a certain period of time) (e.g., the second slope M2 of FIG. 2B or FIG. 4B, which approaches to zero, i.e., horizontal, and the third slope N3 of FIG. 3B or FIG. 5B, which approaches to zero, i.e., horizontal), the detection device 30 stops applying the force F to the weld point P.

When the detection module 10 detects that the displacement signal L has one or two slopes, the detection module 10 determines that no gap G exists between the first welded object A and the second welded object B, and the welding quality of the weld point P is solid, successful or good. In an embodiment, the one slope is represented by the second slope M2 shown in FIG. 2B or FIG. 4B, which indicates that the probe 31 is in contact with the weld point P in the beginning, and thus no first slope M1 is included. In another embodiment, the two slopes are composed by the first slope M1 and the second slope M2 shown in FIG. 2B or FIG. 4B.

When the detection module 10 detects that the displacement signal L has three or more slopes, the detection module 10 determines that a gap G (e.g., a small gap of 10 to 1000 μm) exists between the first welded object A and the second welded object B, and detects that the welding quality of the weld point P is failed or poor. In an embodiment, the three slopes are composed of the first slope N1, the second slope N2 and the third slope N3 shown in FIG. 3B or FIG. 5B.

When the detection module 10 detects that the displacement signal L has three slopes, the detection module 10 calculates a value of the gap G between the first welded object A and the second welded object B based on the positions (i.e., two different positions of the probe 31) of two intersection points formed by the three slopes. In an embodiment, two intersection points formed by the three slopes shown in FIG. 5B include a first intersection point formed by the first slope N1 and the second slope N2, and a second intersection point formed by the second slope N2 and the third slope N3. Therefore, the detection module 10 calculates the value (e.g., 90 μm) of the gap G between the first welded object A and the second welded object B based on a difference between a position (e.g., 1,200 μm) of the first intersection point C1 and a position (e.g., 1,110 μm) of the second intersection point C2.

The displacement detector 32 can be disposed in the detection device 30. The detection device 30 includes one or more probes 31 connected to the displacement detector 32, each of the probes 31 corresponding to one weld point P. The detection device 30 uses the probe 31 to apply the force F to the weld point P of one of the first welded object A and the second welded object B that are welded together (e.g., overlapped and welded), and the displacement detector 32 uses the probe 31 to detect the displacement signal L. In another embodiment, the displacement conversion interface 40 is connected to the displacement detector 32, converts voltage data of the displacement signal L into displacement data of the displacement signal L, and transmits the displacement data of the displacement signal L to the detection module 10.

The force actuator 22 of the force controlling device 20 can be connected to the detection device 30, and the force actuator 22 provides or outputs the force F to the detection device 30. The detection device 30 then applies the force F to the weld point P of one of the first welded object A and the second welded object B that are welded together. The force controlling interface 21 of the force controlling device 20 is connected to the force actuator 22, and controls or adjusts a magnitude of the force F provided or output by the force actuator 22. The force actuator 22 controls a magnitude of the force F applied by the detection device 30 to the weld point P of one of the first welded object A and the second welded object B.

Figure 2A:
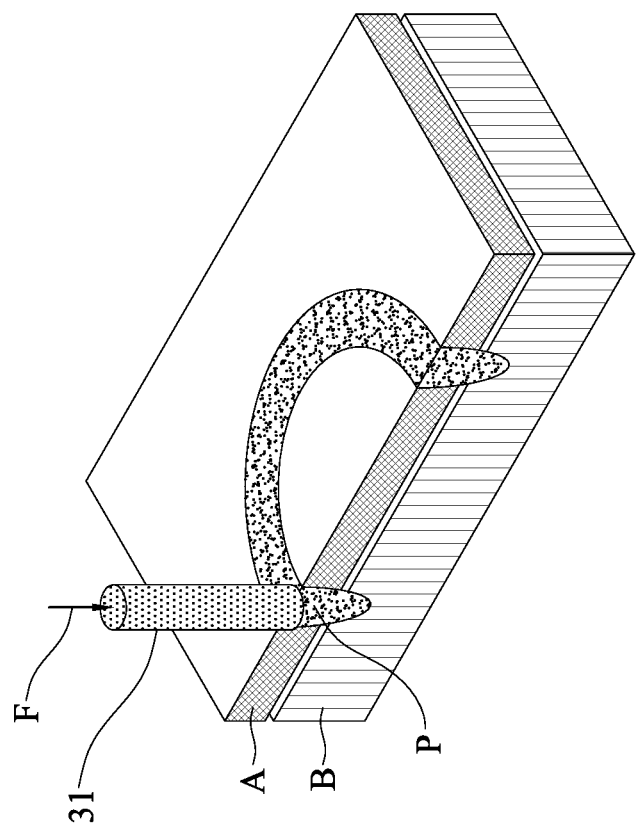
FIG. 2A schematically illustrates a detection device of FIG. 1 applying a force to a weld point of a first welded object, wherein no gap exists between the weld point of the first welded object and a second welded object.

FIG. 2A schematically illustrates the detection device 30 of FIG. 1 applying the force F to the weld point P of the first welded object A, wherein no gap exists between the weld point P of the first welded object A and the second welded object B. FIG. 2B is a curve showing a slope of a displacement signal L that varies with a force or time detected by the detection module 10 of FIG. 1 based on the operation of the detection of FIG. 2A.

As shown in FIG. 2A, the detection device 30 applies the force F to the weld point P of the first welded object A, wherein the weld point P of the first welded object A is welded to the second welded object B (e.g., overlapped and welded). As shown in FIG. 2B, the detection module 10 determines that no gap exists between the first welded object A and the second welded object B based on the two slopes of the displacement signal L composed by the first slope M1 and the second slope M2, to detect that the welding quality of the weld point P is solid, successful or good.

In FIG. 2B, the first slope M1 indicates a non-pressing region, within which the probe 31 moves downward to the weld point P of the first welded object A, and the second slope M2 indicates a stable region, within which no gap exists between the weld point P of the first welded object A and the second welded object B, and the weld point P of the first welded object A is bonded or welded to the second welded object B directly.

Figure 3A:
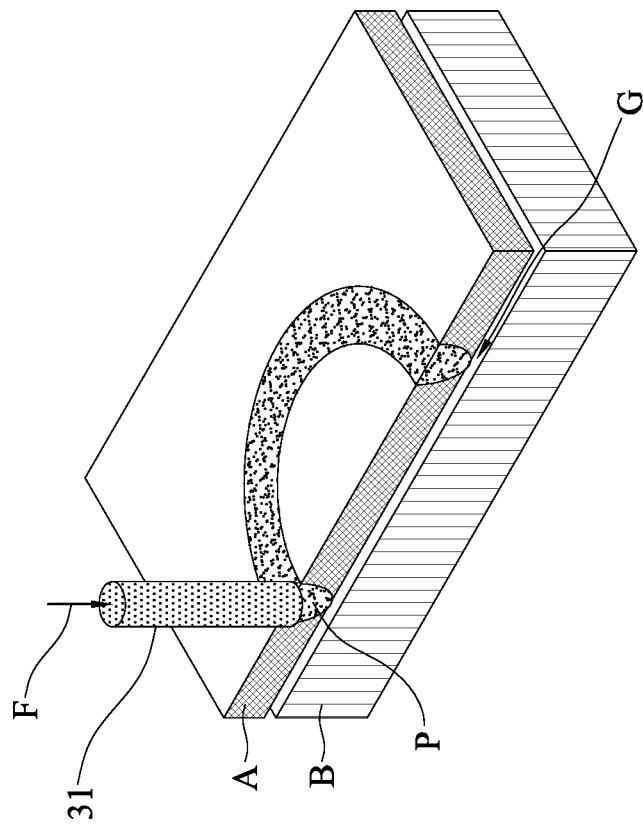
FIG. 3A schematically illustrates a detection device of FIG. 1 applying a force to a weld point of a first welded object, wherein a gap exists between the weld point of the first welded object and a second welded object.

FIG. 3A schematically illustrates the detection device 30 of FIG. 1 applying the force F to the weld point P of the first welded object A, wherein a gap G exists between the weld point P of the first welded object A and the second welded object B. FIG. 3B is a curve showing a slope of the displacement signal L that varies with a force or time detected by the detection module 10 of FIG. 1 based on the operation of the detection of FIG. 3A.

As shown in FIG. 3A, the detection device 30 applies the force F to the weld point P of the first welded object A, and the weld point P of the first welded object A is not welded to the second welded object B. As shown in FIG. 3B, the detection module 10 determines that a gap G exists between the first welded object A and the second welded object B based on the three slopes of the displacement signal L composed of the first slope N1, the second slope N2 and the third slope N3, to detect that the welding quality of the weld point P is failed or poor.

In FIG. 3B, the first slope N1 indicates a non-pressing region, within which the probe 31 moves downward to the weld point P of the first welded object A. The second slope N2 indicates a pressing region, within which a gap G exists between the weld point P of the first welded object A and the second welded object B, and the weld point P of the first welded object A is pressed downward by the force F. The third slope indicates a stable region, within which no gap G (or the gap G is zero) exists between the weld point P of the first welded object A and the second welded object B, and the weld point P of the first welded object A is in direct contact with the second welded object B.

FIG. 4A schematically illustrates the detection device 30 of FIG. 1 applying the force F to the weld point P of the first welded object A of an embodiment, wherein no gap exists between the weld point P of the first welded object A and the second welded object B. FIG. 4B is a curve showing a slope of the displacement signal L that varies with a force or time detected by the detection module 10 of FIG. 1 based on the operation of the detection of FIG. 4A.

As shown in FIG. 4A, which is similar to FIG. 2A, the detection device 30 applies the force F to the weld point P of the first welded object A, and the weld point P of the first welded object A is welded to the second welded object B. As shown in FIG. 4B, which is similar to FIG. 2B, the detection module 10 determines that no gap exists between the first welded object A and the second welded object B based on the two slopes of the displacement signal L1 composed of the first slope M1 and the second slope M2, to detect that the welding quality of the weld point P is solid, successful or good.

Figure 5A:
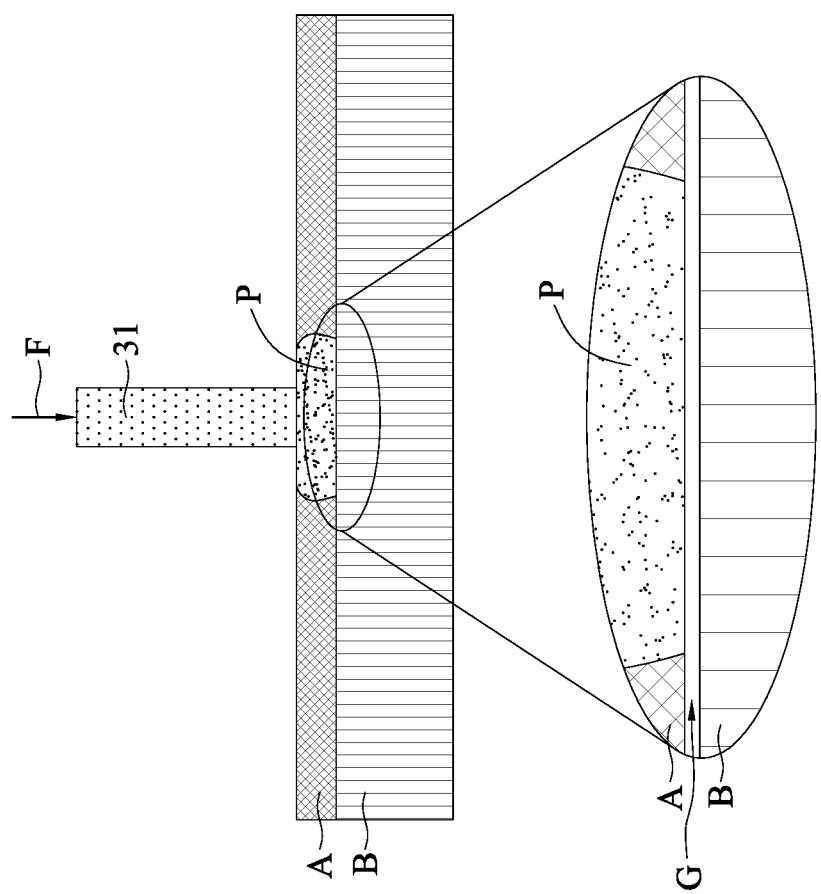
FIG. 5A schematically illustrates a detection device of FIG. 1 applying a force to a weld point of a first welded object of an embodiment, wherein a gap exists between the weld point of the first welded object and a second welded object.
Figure 5B:
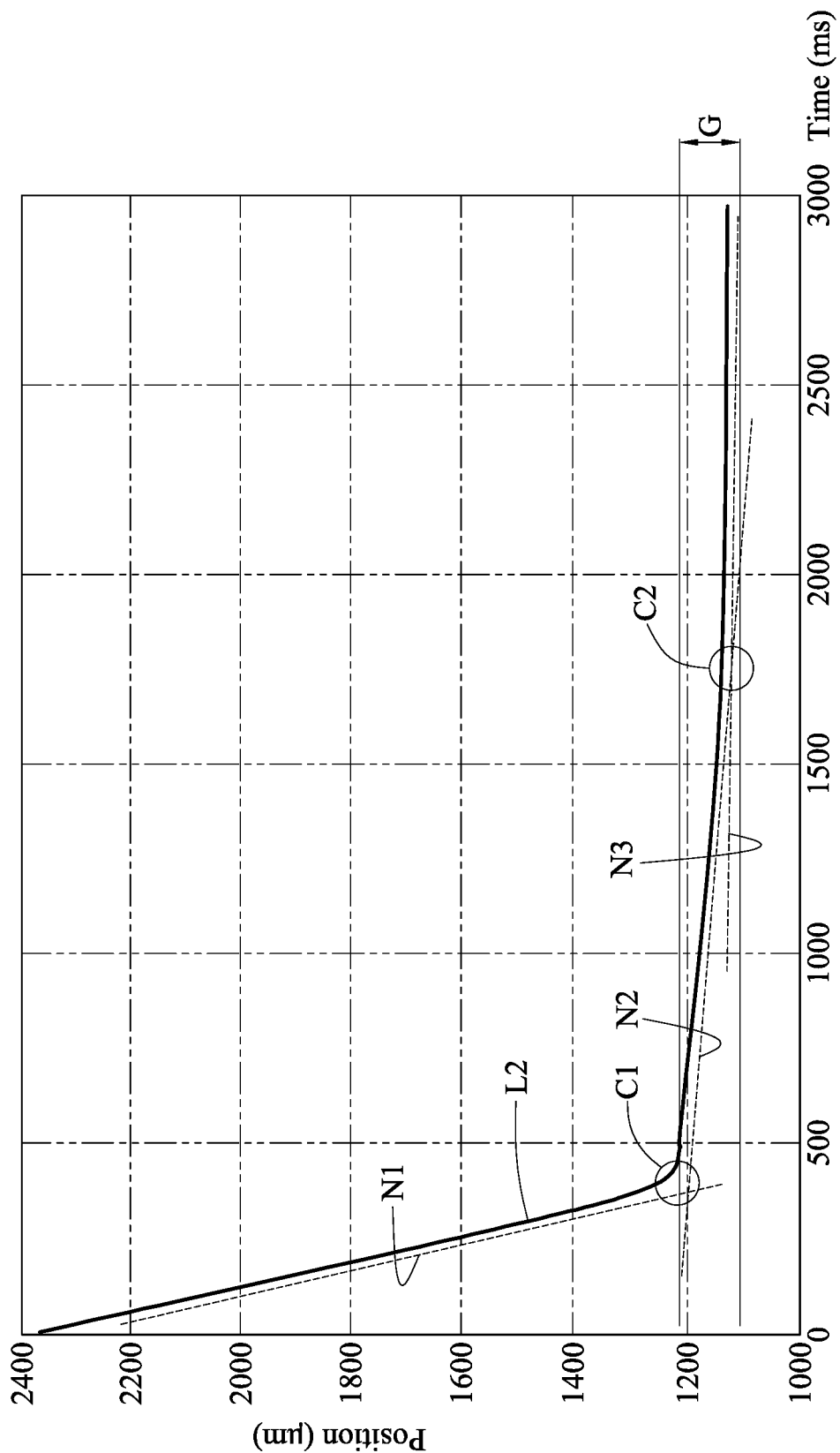
FIG. 5B is a curve showing a slope of a displacement signal that varies with a force or time detected by the detection module of FIG. 1 based on the operation of the detection of FIG. 5A.

FIG. 5A schematically illustrates the detection device 30 of FIG. 1 applying the force F to the weld point P of the first welded object A of an embodiment, wherein a gap G exists between the weld point P of the first welded object A and the second welded object B. FIG. 5B is a curve showing a slope of the displacement signal L2 that varies with a force or time detected by the detection module 10 of FIG. 1 based on the operation of the detection of FIG. 5A.

As shown in FIG. 5A, which is similar to FIG. 3A, the detection device 30 applies the force F to the weld point P of the first welded object A, and the weld point P of the first welded object A is not welded to the second welded object B. As shown in FIG. 5B, which is similar to FIG. 3B, the detection module 10 determines that a gap G exists between the first welded object A and the second welded object B based on the three slopes of the displacement signal L2 composed of the first slope N1, the second slope N2 and the third slope N3, and detects that the welding quality of the weld point P is failed or poor.

As shown in FIG. 5B, when detecting that the displacement signal L2 has three slopes, the detection module 10 calculates a value of the gap G between the first welded object A and the second welded object B based on positions (i.e., two different positions of the probe 31) of two intersection points formed by the three slopes. As shown in FIG. 5B, the two intersection points include a first intersection point C1 formed by the first slope N1 and the second slope N2, and a second intersection point C2 formed by the second slope N2 and the third slope N3. Therefore, the detection module 10 calculates the value (e.g., 90 µm) of the gap G between the first welded object A and the second welded object B based on a difference between a position (e.g., 1,200 µm) of the first intersection point C1 and a position (e.g., 1,110 µm) of the second intersection point C2.

Figure 6:
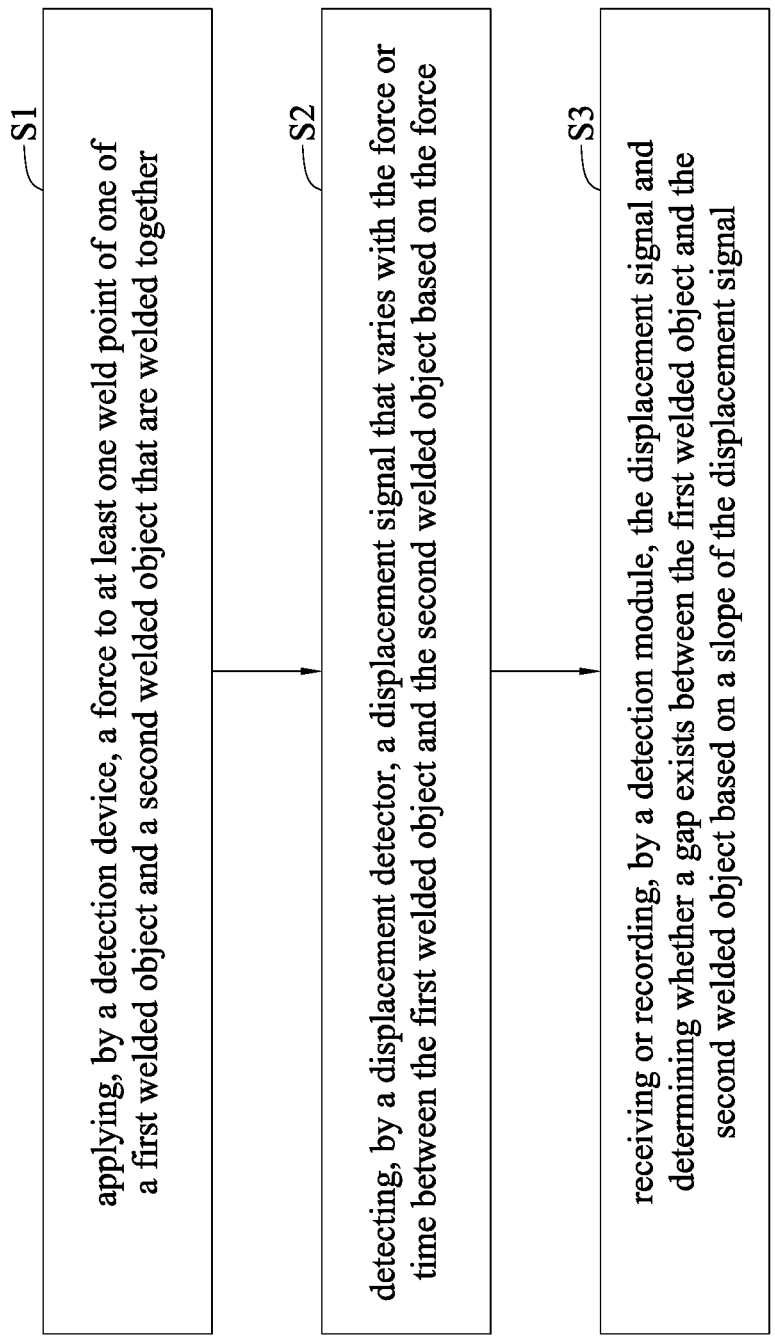
FIG. 6 is a flow chart of a welding quality detection method according to the present disclosure.

FIG. 6 is a flow chart of a welding quality detection method according to the present disclosure.

In step S1, a detection device 30 applies a force F to one or more weld points P of one of a first welded object A and a second welded object B that are welded together (e.g., overlapped and welded). In an embodiment, the force F is constant or increases as time elapses.

In step S2, a displacement detector 32 detects a displacement signal L that varies with the force F or time between the first welded object A and the second welded object B based on the force F.

In step S3, a detection module 10 receives or records the displacement signal L, and determines whether a gap G exists between the first welded object A and the second welded object B based on a slope of the displacement signal L.

When the displacement signal L has a constant position value (i.e., the position of the probe 31), or the position value is stable, the detection device 30 stops applying the force F to the weld point P.

When detecting that the displacement signal L has one or two slopes, the detection module 10 determines that no gap G exists between the first welded object A and the second welded object B, and detects that the welding quality of the weld point P is solid, successful or good.

When detecting that the displacement signal L has three or more slopes, the detection module 10 determines that a gap G exists between the first welded object A and the second welded object B, and detects that the welding quality of the weld point P is failed or poor.

When detecting that the displacement signal L has three slopes, the detection module 10 calculates a value of the gap G between the first welded object A and the second welded object B based on positions (i.e., two different positions of the probe 31) of two intersection points formed by the three slopes.

The detection device 30 uses the probe 31 to apply the force F to the weld point P of one of the first welded object A and the second welded object B that are welded together, and displacement detector 32 uses the probe 31 to detect the displacement signal L. Alternatively, the displacement conversion interface 40 coverts voltage data of the displacement signal L detected by the displacement detector 32 into displacement data of the displacement signal L, and transmits the displacement data of the displacement signal L to the detection module 10.

The force actuator 22 of the force controlling device 20 provides or outputs the force F to the detection device 30, and then the detection device 30 applies the force F to the weld point P of one of the first welded object A and the second welded object B that are welded together. The force controlling interface 21 of the force controlling device 20 controls or adjusts a magnitude of the force F provided or output by the force actuator 22 so that the force controlling interface 21 controls the magnitude of the force F applied by the detection device 30 to the one or more weld points P of one of the first welded object A and the second welded object B via the force actuator 22.

The welding quality detection system and welding quality detection method according to the present disclosure have at least the following advantages, characteristics and technical efficacy.

Firstly, the welding quality of a weld point between a first welded object and a second welded object can be determined based on a slope of a displacement signal easily and quickly.

Secondly, the force, time, displacement signal, slope and gap according to the present disclosure are quantized, such that the detection stability of welded objects or weld points are improved.

Thirdly, in addition to detecting the welding quality of the weld point in real time, the present disclosure can also determine the positions of false weld points and solid weld points precisely, and detect the weld points, without further considering the geometric tolerance of the welded objects (excluding the effect of geometric tolerance).

Fourthly, the present disclosure can detect the gap between two welded objects when a false weld point exists, determine the positions of false weld points and solid weld points based on the variation of a slope of the displacement signal, and analyze a value of the gap, which facilitate the subsequent supplemental welding process to the false weld points.

Fifthly, the welding quality detection system according to the present disclosure can be modularized, and a plurality of probes correspond to a plurality of weld points, to implement detecting a plurality of weld points by a plurality of probes at the same time and achieve the detection of a great number of weld points at once.

It will be apparent to those skilled in the art that various modifications and variations can be made to the disclosed embodiments. It is intended that the specification and examples be considered as exemplary only, with a true scope of the present disclosure being indicated by the following claims and their equivalents.

What is claimed is:

1. A welding quality detection system, comprising:
    a detector configured for applying a force to at least one weld point of one of a first welded object and a second welded object welded together;
    a displacement detector configured for detecting a displacement signal varying with the force or time between the first welded object and the second welded object welded together based on the force applied to the weld point by the detector; and
    a detection module configured for receiving or recording the displacement signal and determining whether a gap exists between the first welded object and the second welded object welded together based on a slope of the displacement signal detected by the displacement detector, wherein the detection module is a detection chip, a detection circuit, a data processor, an analyzer, a computer or a server having detecting function,
    wherein when the detection module detects that the displacement signal has three or more slopes, the detection module determines that a gap exists between the first welded object and the second welded object, and
    wherein when the detection module detects that the displacement signal has three slopes, the detection module calculates a value of the gap between the first welded object and the second welded object based on positions of two intersection points formed by the three slopes.

2. The welding quality detection system of claim 1, wherein the force is constant or increases as time elapses.

3. The welding quality detection system of claim 1, wherein when a position value in the displacement signal is constant or varies stably, the detector stops applying the force.

4. The welding quality detection system of claim 1, wherein when the detection module detects that the displacement signal has one or two slopes, the detection module determines that no gap exists between the first welded object and the second welded object.

5. The welding quality detection system of claim 1, wherein the displacement detector is disposed in the detector having at least one probe connected to the displacement detector, and wherein the detector applies the force to the weld point by the probe and the displacement detector detects the displacement signal by the probe.

6. The welding quality detection system of claim 1, further comprising a force controlling device connected to the detector and having a force actuator configured for providing the force to the detector so that the detector applies the force to the weld point.

7. The welding quality detection system of claim 6, wherein the force controlling device further comprises a force controlling interface connected to the force actuator and configured for controlling a magnitude of the force provided by the force actuator so that the force controlling interface controls the magnitude of the force applied by the detector to the weld point via the force actuator.

8. The welding quality detection system of claim 1, further comprising a displacement conversion interface connected to the displacement detector and configured for converting voltage data of the displacement signal detected by the displacement detector into displacement data of the displacement signal and transmitting the displacement data of the displacement signal to the detection module.

* * * * *